Nov. 1, 1932.  R. E. LYFORD  1,886,205
SPRING PRESSURE CONTACT ELEMENT
Filed July 1, 1929   2 Sheets-Sheet 1

Inventor
Robert E. Lyford
By

Nov. 1, 1932.                R. E. LYFORD                1,886,205
                    SPRING PRESSURE CONTACT ELEMENT
                    Filed July 1, 1929       2 Sheets-Sheet 2
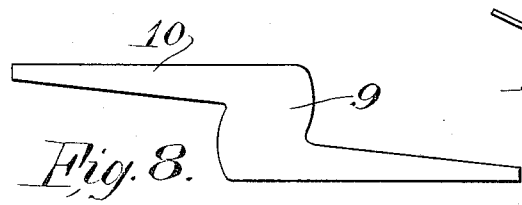
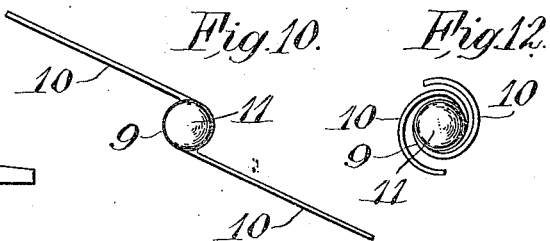
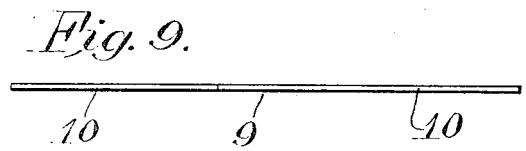
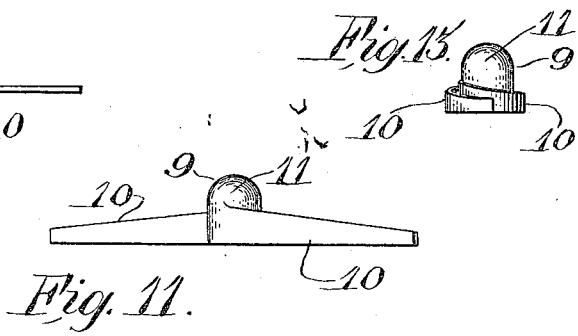
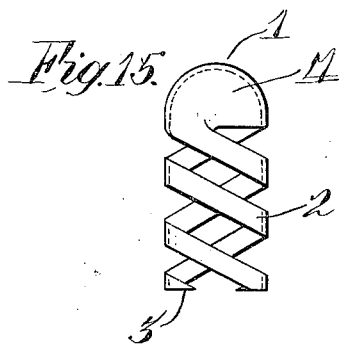
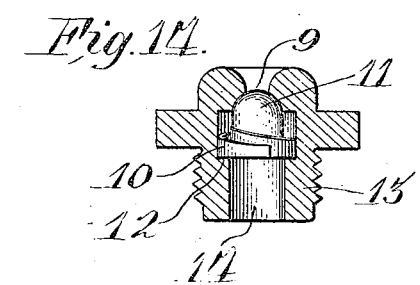
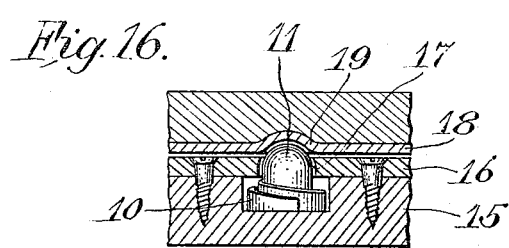
Inventor
Robert E. Lyford
By H. F. Doolittle
Atty.

Patented Nov. 1, 1932

1,886,205

UNITED STATES PATENT OFFICE

ROBERT E. LYFORD, OF CHICAGO, ILLINOIS, ASSIGNOR TO INTERNATIONAL HARVESTER COMPANY, A CORPORATION OF NEW JERSEY

SPRING PRESSURE CONTACT ELEMENT

Application filed July 1, 1929. Serial No. 375,271.

This invention relates to spring pressure contact elements in which a spring and engaging head are integral, and to a method of manufacturing the elements. The invention also relates to structures in which elements of this nature are embodied, such as retaining devices and check valves.

The object of the invention is to devise a spring pressure contact element having a spring integral with an engaging head, and a simple and economical method of manufacturing such elements. Another object is to shape and position the spring portion so that the element may be inserted into casing members and held in position therein by the spring portion.

I accomplish these and other objects by stamping out blanks and shaping them as shown in the drawings and described in the detailed description to follow.

In the drawings,—

Figure 8 is a plan view of a modified shape of blank;

Figure 9 is an elevation of the blank shown in Figure 8;

Figure 10 is a plan view of the blank shown in Figure 8 after the head portion has been formed;

Figure 11 is an elevation showing the blank extensions before they are formed into springs;

Figure 12 is a plan view showing the extensions formed into springs;

Figure 13 is an elevation of the completed element shown in Figure 12;

Figure 14 shows a check valve embodying one of the completed elements;

Figure 15 shows a modification in which the spring pressed element is cylindrical in shape; and, Figure 16 shows a retaining device embodying the form of element shown in Figures 12 and 13.

Figure 1:
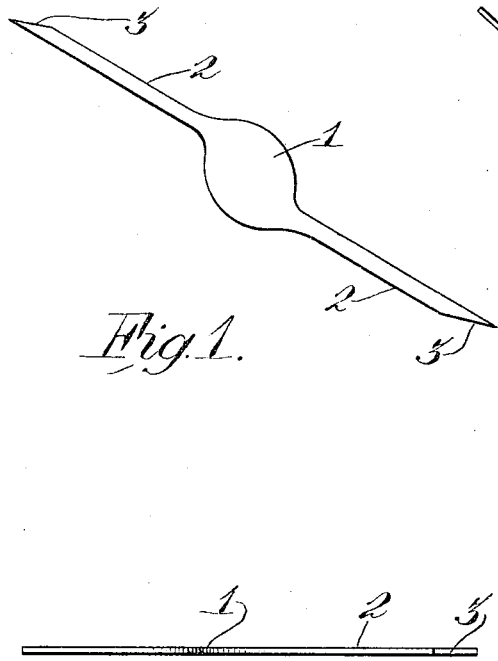
Figure 1 is a plan view of a blank used in forming the spring pressure contact element of this invention.
Figure 2:
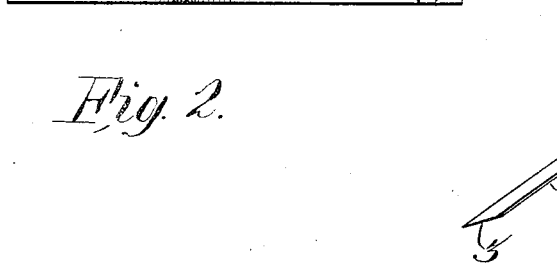
Figure 2 is an elevation of the blank shown in Figure 1.

In the manufacture of spring pressed elements of this invention, a flat blank, such as shown in Figure 1, is formed with a substantially circular body portion 1 and narrow, integral extensions 2 having angular ends 3. As shown in Figure 2, the blank is of uniform thickness and comparatively thin.

Figure 3:
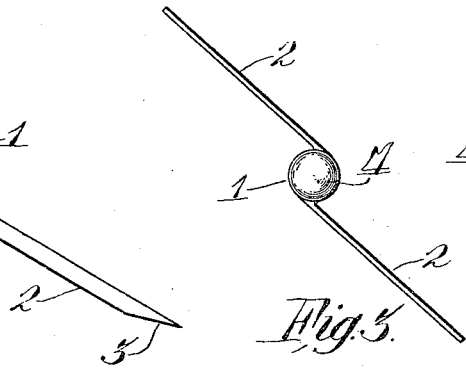
Figure 3 is a plan view showing the blank after the head has been formed.
Figure 5:
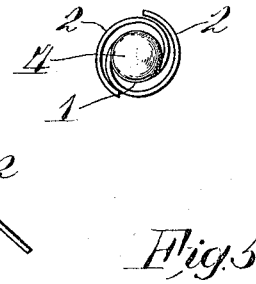
Figure 5 is a plan view showing a completely formed spring pressed element.
Figure 4:
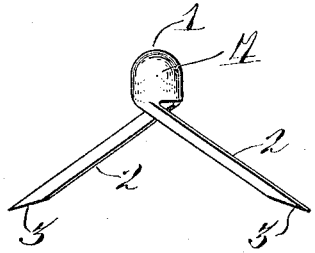
Figure 4 is an elevation showing the first position of the extensions on the blank during the formation of the spring portions.
Figure 6:
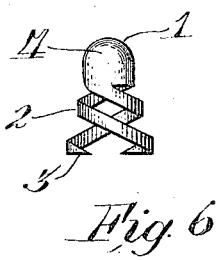
Figure 6 is an elevation of the element shown in Figure 5.
Figure 7:
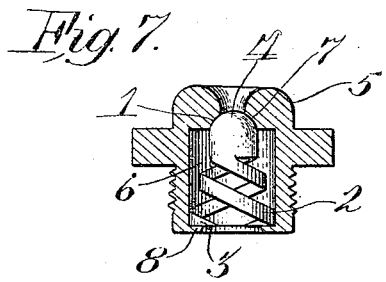
Figure 7 shows a check valve assembly, in which one of the spring pressed elements is a part.

As shown in Figure 3, the central body portion 1 of the blank is shaped by a die to form a head portion 4 adapted to serve as an engaging surface. The extensions 2 are bent downwardly at a suitable angle, as shown in Figure 4, and wrapped around a mandrel to coil them as shown in Figures 5 and 6. The angled end portions 3 are so shaped that in the finished form the edges lie in a plane at right angles to the axis of the spring coils, as shown in Figure 6. In Figure 7, a valve casing 5 contains one of the spring pressed elements. The valve casing contains a chamber 6 in which the element is positioned. The head portion 4 of the element engages a seating surface 7 on the casing 5. The bottom of the casing is provided with a ledge 8 on which the ends 3 of the spring pressed element rest. The nature of the spring pressed element 4 is such that it may be inserted in the casing, in which the spring portions are seated on the ledge 8 with the spring under sufficient compression to keep the head portion 4 in contact with the valve seat 7 until the pressure is reached for which the valve is made to release.

The modification shown in Figures 8 to 14 is constructed in a similar manner. It will be noticed that in the blank shown in Figure 8, the head portion 9 is somewhat different in shape, and the extensions 10 are differently positioned. In the first step of manufacture when the head portion 11 is formed, as shown in Figures 10 and 11, the extensions 10 are bent over with their outer edges lying substantially in a plane. To produce the completed element shown in Figures 12 and 13, the extensions 10 are coiled with their lower edges remaining substantially in the same plane. As shown in the valve structure, (Figure 14), the spring portions 10 of the spring pressed element rest upon the ledge 12 in the casing 13. In this modification, the spring pressed member may be inserted through the bore 14 in the casing by compressing the spring portions 10 in coiled position. Figure 16 shows a retaining device embodying the spring pressed element shown in Figures 12 and 13. The element is set into a member 15 which may, for example, be the door of a cabinet. It is held in position by a plate 16 having an opening 17 through which the head portion 11 of the element protrudes. A plate 18 with a depression 19 is positioned in close proximity to the plate 16. It will be seen that the head portion 11 of the spring pressed element can be depressed to permit engagement with the depression 19 in the member 18.

Although I have shown and described the spring pressed element of this invention as being applied only to valves and retaining devices, it has a wide field of use, and applicant limits his invention only by the scope of the appended claims.

What is claimed is:

A check valve comprising a one-piece casing formed with a bore therethrough and openings at each end communicating with said bore, said openings being smaller than the bore in diameter and one of said openings being smaller than the other, a valve member fitted in said bore, said member having an engaging head smaller than the larger opening and larger than the other opening, and an integral spring portion spirally extending from the engaging head, said spring portion having a diameter larger than the larger opening, thereby retaining the valve member within the bore.

In testimony whereof I affix my signature.

ROBERT E. LYFORD.